US009163378B2

(12) United States Patent
Doan et al.

(10) Patent No.: US 9,163,378 B2
(45) Date of Patent: Oct. 20, 2015

(54) PIN RETAINER FOR DRAGLINE PINS

(71) Applicant: Columbia Steel Casting Co., Inc., Portland, OR (US)

(72) Inventors: Stephen P. Doan, Oregon City, OR (US); David E. Havel, Aurora, OR (US); Brian C. Matlock, Portland, OR (US)

(73) Assignee: Columbia Steel Casting Co., Inc., Portland, OR (US)

( * ) Notice: Subject to any disclaimer, the term of this patent is extended or adjusted under 35 U.S.C. 154(b) by 257 days.

(21) Appl. No.: 13/691,206

(22) Filed: Nov. 30, 2012

(65) Prior Publication Data
US 2013/0133175 A1 May 30, 2013

(30) Foreign Application Priority Data

Nov. 30, 2011 (AU) ................................ 2011253753

(51) Int. Cl.
*E02F 3/48* (2006.01)
*E02F 3/58* (2006.01)
*F16B 21/12* (2006.01)

(52) U.S. Cl.
CPC . *E02F 3/58* (2013.01); *F16B 21/12* (2013.01); *Y10T 29/49947* (2015.01); *Y10T 403/581* (2015.01)

(58) Field of Classification Search
CPC .......... F16B 21/10; F16B 21/12; F16B 21/16; F16B 2021/14; E02F 3/143; E02F 3/46; E02F 3/48
USPC ............ 37/394, 397, 398, 399; 403/315, 319, 403/355
See application file for complete search history.

(56) References Cited

U.S. PATENT DOCUMENTS

| 1,033,411 | A | | 7/1912 | Jones |
| 2,124,912 | A | * | 7/1938 | Ehmann ............................ 59/86 |
| 2,208,189 | A | | 7/1940 | Jones |
| 2,967,726 | A | | 1/1961 | Weston |
| 3,915,469 | A | | 10/1975 | Vanice |
| 5,367,798 | A | | 11/1994 | Hughes |
| 5,435,084 | A | * | 7/1995 | Immel ............................ 37/398 |
| 5,491,992 | A | | 2/1996 | Mandall |
| 5,791,809 | A | | 8/1998 | Bessey |
| 6,158,917 | A | | 12/2000 | Wolin et al. |

(Continued)

FOREIGN PATENT DOCUMENTS

| AU | 2005203717 | 3/2006 |
| AU | 2010101088 | 11/2010 |

OTHER PUBLICATIONS

Examination Report from the Australian Patent Office for Australian Patent Application No. 2011253753 (mailed May 2, 2014).

(Continued)

*Primary Examiner* — Michael P Ferguson
(74) *Attorney, Agent, or Firm* — Klarquist Sparkman, LLP

(57) ABSTRACT

A locking device that connects to a grooved end of a dragline pin includes a lock block and a lock pin. The lock block has a through opening sized to receive the end of the pin. There is a bore formed in the lock block and transversely intersecting the through opening which is dimensioned to receive the lock pin. The lock pin is configured to pass through a portion of the grooved end of a received dragline pin received in the through opening to lock the dragline pin and any attached dragline component.

8 Claims, 5 Drawing Sheets

(56) References Cited

U.S. PATENT DOCUMENTS

| | | | |
|---|---|---|---|
| 7,178,274 B2* | 2/2007 | Emrich | 37/453 |
| 7,461,995 B2 | 12/2008 | Burnley | |
| 7,707,755 B2* | 5/2010 | Lopez Almendros et al. | 37/457 |
| 7,980,011 B2* | 7/2011 | Ruvang | 37/452 |
| 8,127,476 B2* | 3/2012 | Bierwith | 37/455 |
| 8,381,363 B2* | 2/2013 | Boeckman et al. | 24/132 WL |
| 2009/0136291 A1 | 5/2009 | McClanahan et al. | |
| 2010/0115804 A1 | 5/2010 | Lopez Almendros et al. | |
| 2010/0170119 A1 | 7/2010 | Lopez Almendros et al. | |

OTHER PUBLICATIONS

CQMX Razer, "Locks," http://cqmsrazer.com/locks/ (printed Oct. 13, 2011).

* cited by examiner

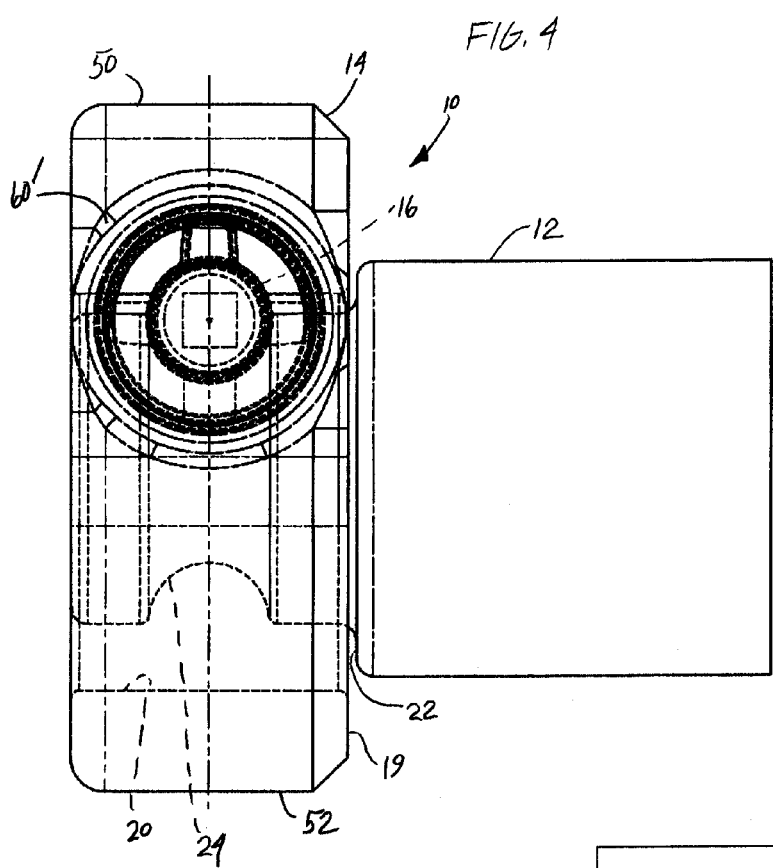
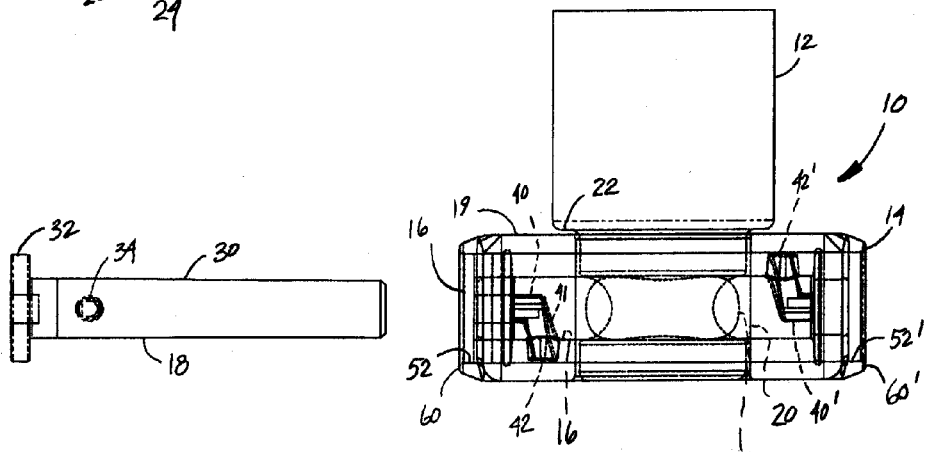

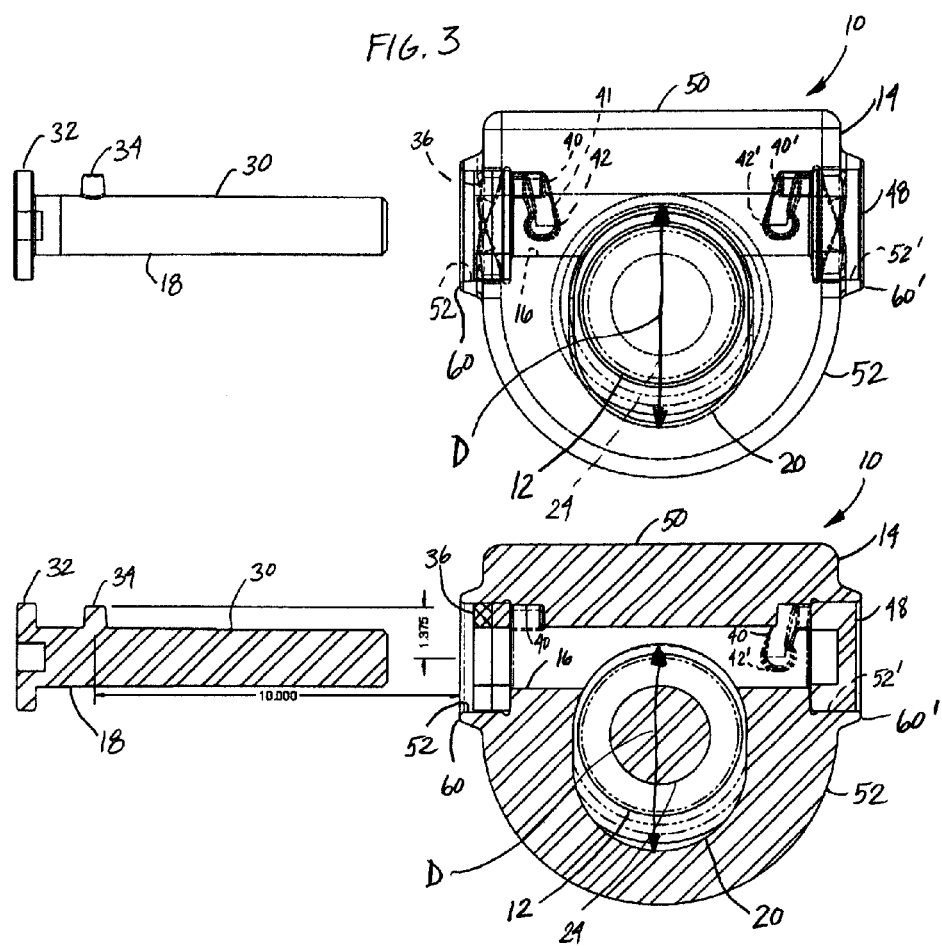

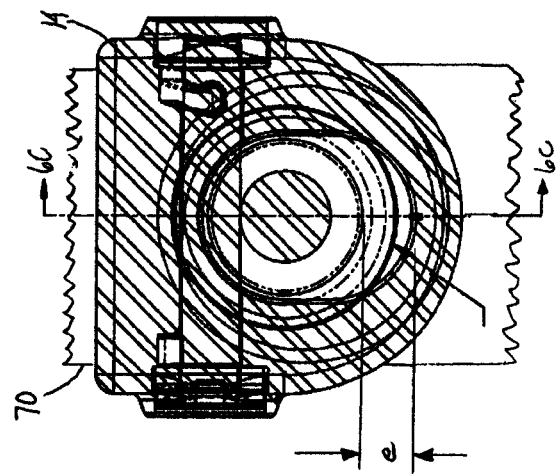
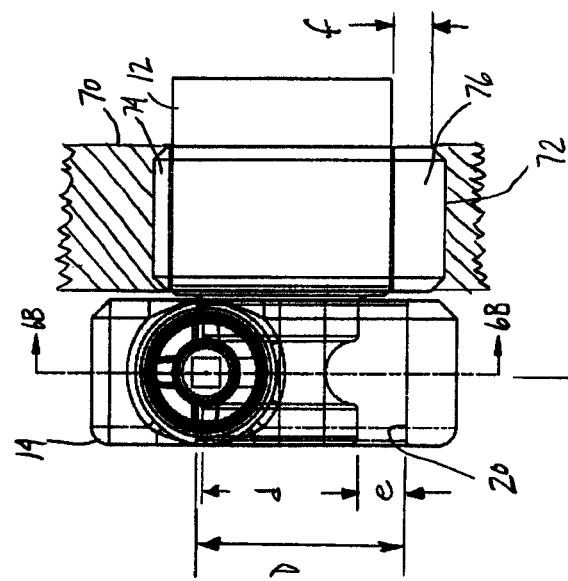
FIG. 6B
FIG. 6A

PIN RETAINER FOR DRAGLINE PINS

CROSS REFERENCE TO RELATED APPLICATION

The present application claims priority from pending Australian Patent Application No. 2011253753, filed Nov. 30, 2011, which is incorporated herein by reference.

BACKGROUND

This application relates to dragline equipment, and in particular, to a locking device used to secure a pin connection of a dragline.

Dragline rigging, i.e., the system of wire ropes, chains and links that suspend and guide a dragline bucket during use, includes a number of pivot connections that each has a pin. These pivot connections are subjected to heavy loads and harsh working environments, so ultimately they wear and require replacement.

Typically, such pins have been retained or "locked" in place by passing the pin through an opening or a pair of aligned openings in a link or other component and then a plate or washer, and then welding a bead of material around the protruding end of pin. The bead makes the end of the pin larger than the opening(s), so the pin is retained in place. Welded connections take time and skill to complete, and the quality of the weld can be difficult to assess.

Some efforts at mechanical retaining pins have been made, but these have other drawbacks. For example, two-piece "clamshell" collars shaped to fit grooves at the end of pins and secured by one bolt at either side are quicker and easier to install. In some environments, however, the exposed bolted connections are subjected to wear and tear during use that no longer allows for easy disassembly.

It would be advantageous to provide a dragline pin connection locking device that is quick and easy to install, secure and has a long useful life.

SUMMARY

Described below is a dragline pin locking device that connects to a grooved end of a dragline pin and has a lock block with a through opening sized to receive the end of the pin, a bore formed in the lock block and transversely intersecting the through opening, and a lock pin sized for insertion through the bore. The lock pin is configured to pass through a portion of the grooved end of a dragline pin received in the through opening, thereby locking the dragline pin in place.

The foregoing and other objects, features, and advantages of the invention will become more apparent from the following detailed description, which proceeds with reference to the accompanying figures.

BRIEF DESCRIPTION OF THE DRAWINGS

FIG. 2 is a top plan view of the lock block and lock pin of FIG. 1 installed over the end of a dragline pin.

FIG. 3 is a front elevation view of the lock block and lock pin of FIG. 2.

FIG. 4 is a side elevation of the lock block and lock pin of FIG. 2.

FIG. 5 is a sectioned front elevation view of the lock block and lock pin of FIG. 2.

FIG. 6A is a right side elevation view of a lock block and lock pin assembled to lock a portion of a dragline component to a dragline pin.

FIG. 6B is a front elevation view of the assembly of FIG. 6A, taken at the line 6B-6B.

DETAILED DESCRIPTION

Figure 1:
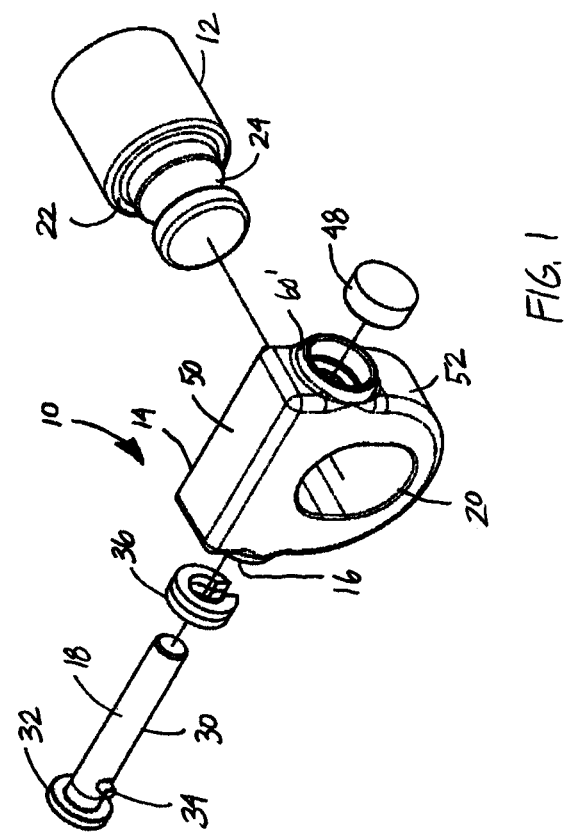
FIG. 1 is a perspective view of a dragline pin locking device showing the lock block with the lock pin removed and before assembly over the end of a dragline pin.

A representative embodiment of a locking device 10 for dragline pins is shown in FIGS. 1-5. The locking device 10 is dimensioned to connect to a dragline pin, a portion of which is shown at 12 in the figures.

The locking device 10 includes a lock block 14, a lock pin 18 and a bore 16 dimensioned to receive the lock pin 18. The bore 16 extends through the lock block 14 in a direction transverse to a through opening 20 dimensioned to receive the dragline pin 12. The bore 16 intersects the through opening 20, preferably at about 90 degrees, and extends in a direction tangential to the through opening 20.

FIG. 1 shows an end of the dragline pin 12 before it is fitted with the locking device 10. FIGS. 2-5 show the locking device 10 fitted to the dragline pin 12, but before it has been secured in place. When the locking device is secured to the dragline pin 12, the locking device 10 and the dragline pin 12 cannot translate relative to each other, but relative rotation is possible.

In some embodiments, the locking device 10 is configured to have a side surface 19 that abuts against a shoulder 22 (FIG. 1) on the dragline pin 12 when the locking device 10 is secured to the dragline pin 12. In some embodiments, the dragline pin 12 has a circumferential groove 24 positioned between the shoulder and an end surface 26 of the dragline pin 12, and the lock pin 18 is configured to extend through a portion of the groove 24.

When installed, the lock pin 18 serves to lock or retain the lock block 14 on the dragline pin 12. There may be a threaded arrangement between the lock pin 18 and the lock block 14. Alternatively, the lock pin 18 may be rotatably engageable with the lock block 14. In the illustrated implementation, the bore 16 has an inner surface in which a groove 40 is defined. The lock pin 18 has a nib 34 sized to be inserted in the groove 40. The groove 40 can define a generally helical path 41 as shown. As the lock pin 18 is inserted into the bore 16, the nib 34 is aligned with the groove 40. Rotating the lock pin 18 clockwise causes it to be drawn into the lock block 14 until the end of the groove 40 is reached. There can be a recess or detent 42 defined at the end of the groove for retaining the nib 34 while the device is in a locked condition. Optionally, a corresponding groove 40' and recess 42' can be defined at the other end of the bore. In one embodiment, the grooves 40 and 40' provide for about 90 degrees of rotation in the lock pin 18.

Optionally, there is an insert 36 made of a resilient material and shaped as a hollow cylinder having a slot 38. The insert 36 can be configured for positioning at one end of the bore 16 where the groove 40 or 40' is in use, such as in a counterbore 52. The insert is dimensioned such that it must be compressed slightly to allow the nib to be rotated into the recess 42 or 42'. In this way, the compressed insert exerts an axial retaining force on the lock pin 18 tending to keep it in the locked position. The other end of the bore 16 can be fitted with a cap 48, such as in a counterbore 52', to prevent dirt and debris from entering the assembly and to make clear which end of the bore is configured to receive the lock pin 18.

The lock pin 18 comprises a head 32 attached to a shaft 30. The head 32 can have a recess shaped to receive any suitable drive to assist in rotating the lock pin 18, such as a ¾" square drive as shown.

The lock block 14 can have a generally D-shaped cross-section as shown in FIGS. 3 and 5. The top surface 50 can be generally planar, and a curved side surface 52 can adjoin both ends of the top surface. The head 32 of the lock pin 18 is preferably flush with a surrounding seating area portion 60 of the side surface 52 when the lock pin 18 is fully inserted in the bore 16. Likewise, the cap 48 is preferably flush with a surrounding seating area portion 60' when it is fully inserted.

The through opening 20 can be elongated. In the illustrated embodiments, the through opening 20 has a greatest dimension D larger than a diameter d of the end of the dragline pin 12.

Figure 6C:
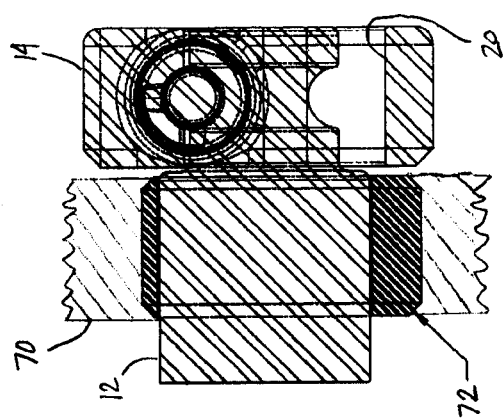
FIG. 6C is a left side elevation view of the assembly of FIG. 6A

Referring to FIGS. 6A-6C, the lock block 14 is shown assembled to lock a dragline component, a portion of which is shown in section at 70, in place on the pin 12. The dragline component can have a bushing 72 with an opening sized to receive the pin 12. The bushing 72 can have an eccentric configuration with a shallower section 74 and a deeper section 76. The deeper section 76 is arranged according to where greater wear is expected as the component 70 rotates relative to the pin 12, in this case along the region that counteracts a load P on the pin 12 in the direction of the arrow.

Referring again to FIG. 6A, the deeper section 76 of the bushing 72 has a dimension f. As can be seen, the through opening 20 is sized greater than the diameter of the pin 12, and there is a clearance between the pin 12 and the opening 20 of a dimension e as shown. Further, the dimension e is greater than the dimension f. In this way, even if the bushing 72 were to wear completely (i.e., the depth of the bushing was reduced from f to zero), the end of the pin 12 would still be separated from the lower boundary of the through opening 20, thus preventing inadvertent contact and wear between these surfaces.

The lock block and the lock pin can be made from any suitable materials, such as high strength steel, although any suitable material can be substituted. The insert can be made of a resilient material, such as a resilient polymeric material.

The lock block may be embodied as a separate component as shown in the illustrated embodiments to form a locking connection with a pin. As described above, the pin is usually attached to a first component. Further, as shown in FIGS. 6A-6C, there may a second component sandwiched between the first component and the lock block. Alternatively, the lock block may be attached to yet another component—such as by being welded to that component—that is to be connected by the pin connection. In addition, the lock block may be embodied in a larger component as part of a pin connection for that component. For example, the lock block structure can be integrally formed with the component, such as being cast into the component.

In view of the many possible embodiments to which the principles of the present disclosure can be applied, it should be recognized that the illustrated embodiments are only examples and should not be taken as limiting the scope of the following claims. We therefore claim all that comes within the scope and spirit of these claims.

We claim:

1. A locking device that connects to an end of a dragline pin having a transverse groove within a peripheral surface thereof, comprising:
    a lock block having a through opening defining an axis and sized to axially receive the end of the dragline pin therethrough;
    a through bore formed in the lock block extending between opposing sides thereof and transversely intersecting the through opening transverse to the axis, the bore having a first end and a groove defined within a peripheral wall of the bore adjacent the first end that defines a spiral shaped path;
    a lock pin sized for insertion through the bore to extend from one side of the lock block, across the opening and into the lock block on an opposite side in a locking position, when the dragline in is received within the through opening, wherein the lock pin has a generally cylindrical body with a head at a first end of the lock pin and a projecting nib shaped and sized to engage the groove at the first end of the bore as the lock pin is rotated relative to the bore into the locking position, wherein the lock pin in the locking position extends within the groove of the dragline in approximately tangential to a base of the transverse groove in the dragline pin and locks the dragline pin from translation relative to the lock block; and
    an insert formed of a resilient material and shaped to be inserted in the first end of the bore, the insert having a slot sized to axially receive the projecting nib therethrough, wherein the insert is configured to be compressed when the lock in is fully installed and to exert an retaining force on the head of the lock in the locking position.

2. The locking device of claim 1, wherein the lock block and lock pin are configured to receive the dragline pin such that the grooved end does not protrude beyond a side surface of the lock block.

3. The locking device of claim 1, wherein the bore extends through the lock block, further comprising a cap shaped to cover a second end of the bore.

4. The locking device of claim 1, wherein the groove of the bore comprises a helical-shaped groove.

5. The locking device of claim 1, wherein the through opening is dimensioned to provide a clearance greater than a depth of expected bushing wear in a bushing of a dragline component through which the dragline pin is positioned to extend.

6. The locking device of claim 1, wherein the lock block has a generally D-shaped section with a flat outer surface adjacent the bore and a generally curved surface connecting ends of the flat surface.

7. The locking device of claim 1, wherein the head of the lock pin is larger than a diameter of the bore.

8. The locking device of claim 7, wherein the head has a recess shaped to receive a tool to drive the lock pin in rotation.

* * * * *